United States Patent [19]
Waeldner et al.

[11] 3,837,571
[45] Sept. 24, 1974

[54] SELF-CONTROLLED AIR DISTRIBUTION SYSTEM

[75] Inventors: William J. Waeldner, Waverly; William J. Harris, Tunkhannock, both of Pa.

[73] Assignee: Dynamics Corporation of America, New York, N.Y.

[22] Filed: Nov. 15, 1972

[21] Appl. No.: 306,559

[52] U.S. Cl. ............ 236/49, 137/804, 236/80, 251/24
[51] Int. Cl. ............ F24f 11/02, G05b 11/46
[58] Field of Search ............ 236/49, 82, 79, 80; 137/804, 805; 251/24

[56] References Cited
UNITED STATES PATENTS
3,426,782   2/1969   Thorburn .................... 137/805
3,719,321   3/1973   McNabney .................... 236/49

*Primary Examiner*—William E. Wayner
*Attorney, Agent, or Firm*—McCormick, Paulding & Huber

[57] ABSTRACT

An air distribution system for supplying conditioned air to at least one zone to be conditioned and comprising a supply duct connected with a diffuser discharging to the conditioned zone. A modulating valve is provided with a bellows actuator and a control for the actuator is of the fluidic type with power for the actuator and control supplied from a total pressure pickup in the duct. A duct static or differential pressure signal is fed to the fluidic control together with a pressure set-point and a zone temperature signal. Zone temperature may be measured at the diffuser with a total duct pressure powered aspirator drawing air over a thermostat or a zone located thermostat may be provided. A warm up override is optional. The fluidics comprise a multistage proportional amplifier and a diaphragm amplifier controlling an orifice in a total duct pressure conduit. A venturi in the conduit has its throat section connected with the bellows actuator selectively to pressurize and draw air therefrom whereby to adjust valve position.

20 Claims, 4 Drawing Figures

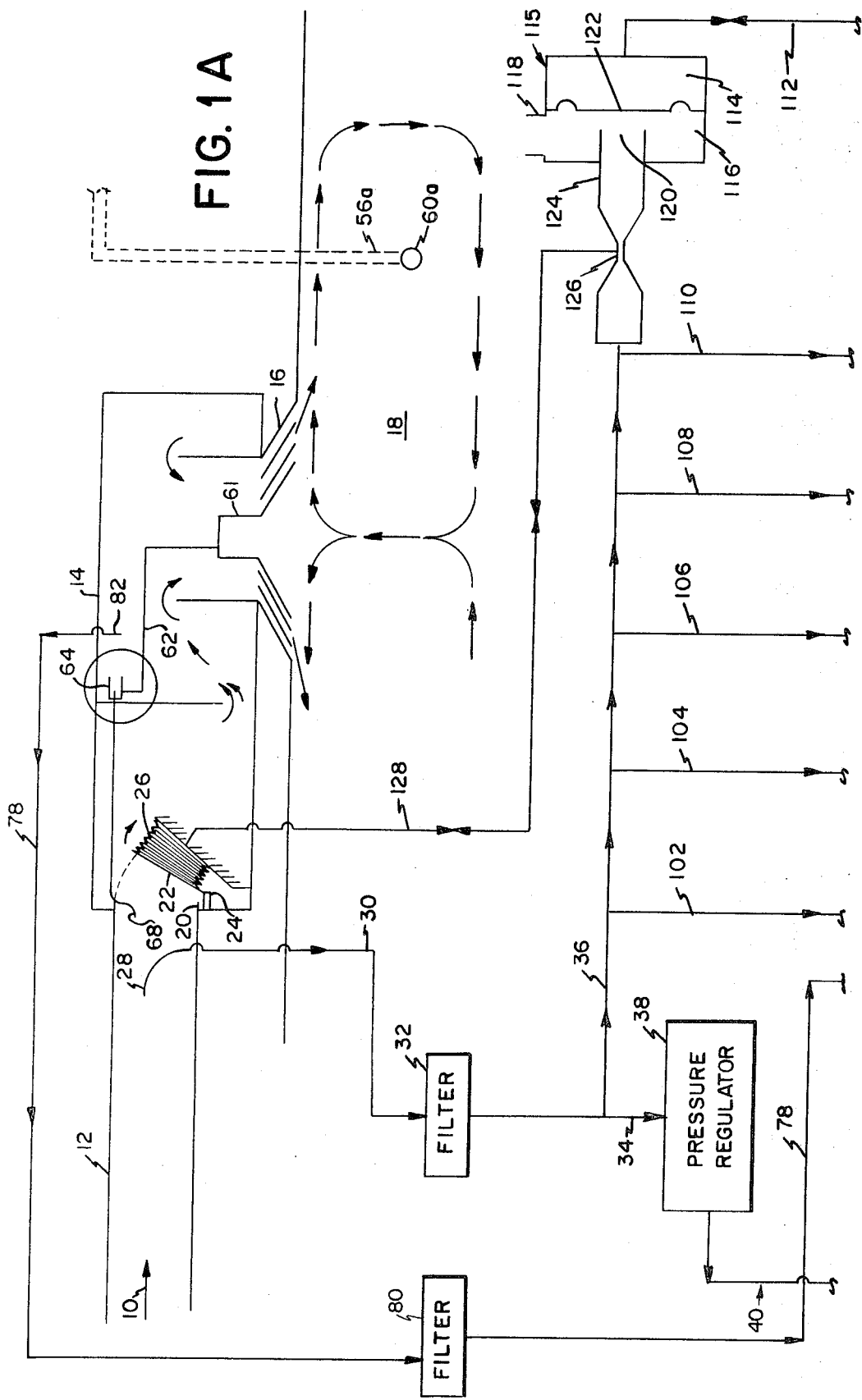

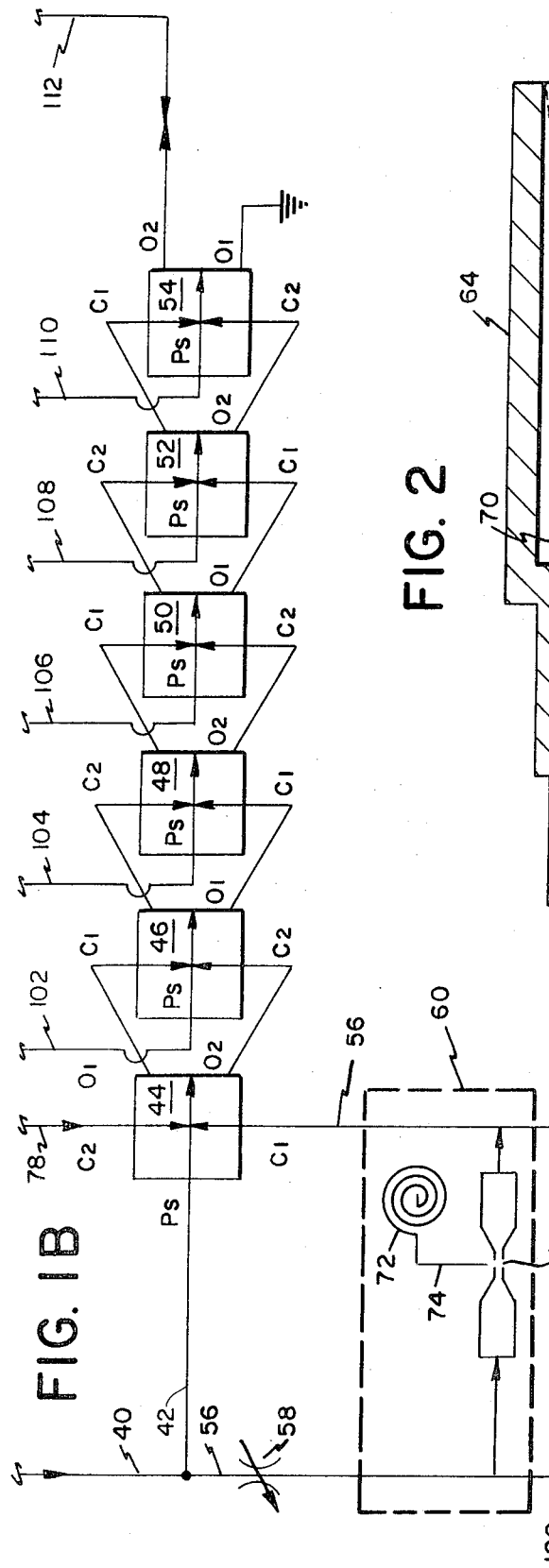
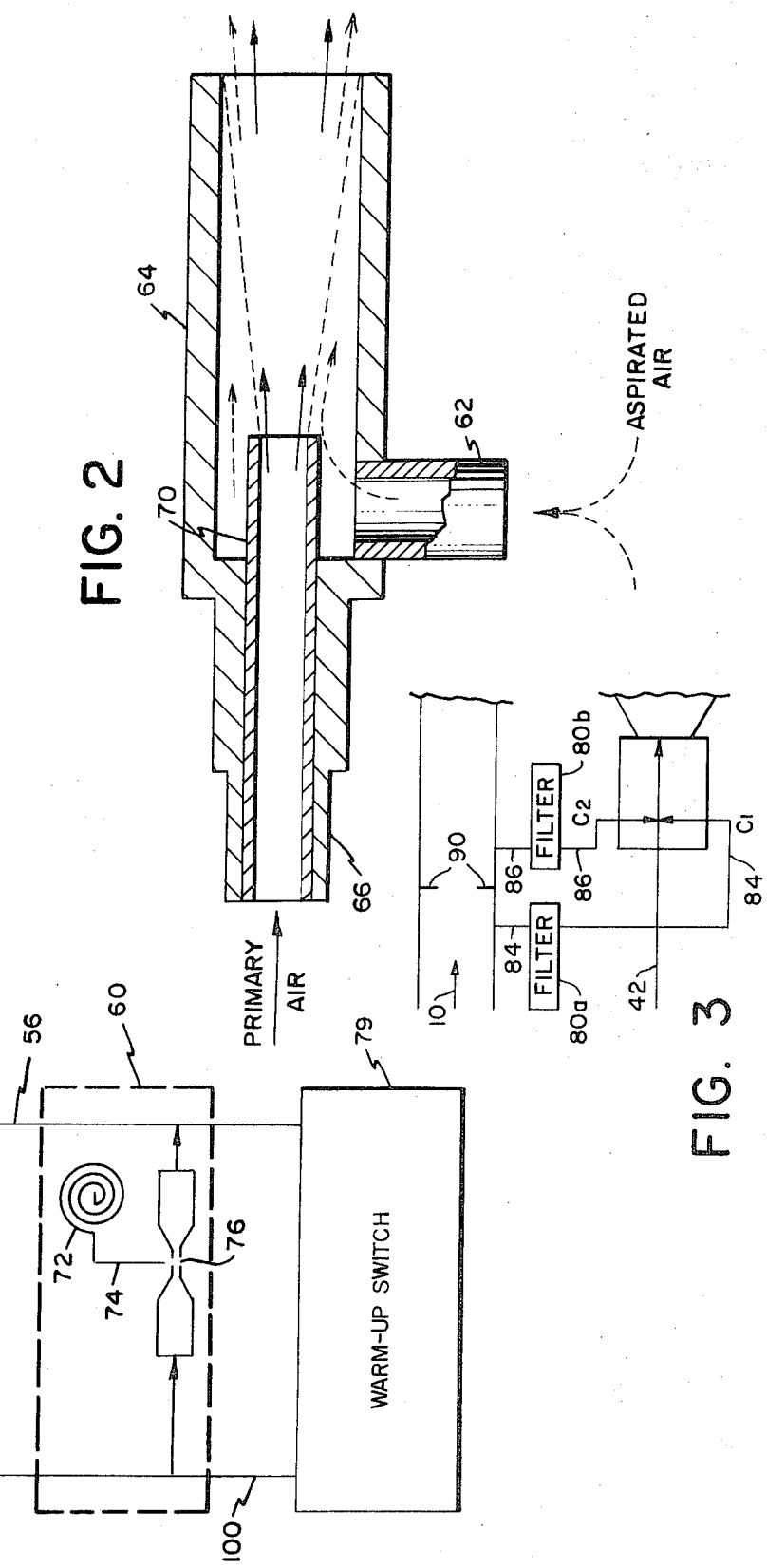
FIG. 1B
FIG. 2
FIG. 3

SELF-CONTROLLED AIR DISTRIBUTION SYSTEM

BACKGROUND OF THE INVENTION

Various types of valves and controls have been available for air distribution systems but have not proven completely satisfactory. Disadvantages have been encountered, as for example, in the requirement for independent power supplies, slow response times, and durability of the controls.

SUMMARY OF THE INVENTION

It is the general object of the present invention to provide an air distribution system with an improved valve and control system, both the control and a valve actuator employing conditioned air in the system as a power supply, and wherein a fast response fluidic control means is provided with a minimum of moving parts for a high degree of dependability and durability in service.

BRIEF DESCRIPTION OF THE DRAWINGS

FIGS. 1a and 1b are a schematic illustration of an air distribution system and associated valve and control in accordance with the present invention.

FIG. 2 is a fragmentary sectional view illustrating an aspirator forming a part of the system of FIGS. 1a and 1b.

FIG. 3 is a fragmentary view similar to a left-hand portion of FIGS. 1A and 1B and showing an alternative embodiment of a portion of the Distribution System.

DESCRIPTION OF PREFERRED EMBODIMENTS

Referring particularly to FIG. 1, it will be observed that conditioned air represented by arrow 10 is introduced to a supply duct indicated generally at 12. The conditioned air in the illustrative example of FIG. 1 may be taken as cooling air supplied from a conventional central air conditioning system, but it will be understood that the air in the distribution system may be heated or otherwise treated or conditioned within the scope of the invention. Moreover, conditioning of the air may involve no more than mere pressurizing of ambient air as may be required for delivery through a distribution system.

Conditioned air introduced to the duct 10 flows rightwardly through a terminal box 14 and a diffuser or outlet 16 to a zone to be conditioned at 18. The terminal box 14 may be of a conventional construction and for the purposes of the present invention may be regarded as a part of the duct 10, the valve and control system of the invention being readily adaptable to a distribution system having a direct connection between a supply duct and diffuser. Similarly, the diffuser may vary widely in construction and the zone 18 may of course comprise a room or other enclosure or may take the form of an area defined within a large enclosure.

At an inlet opening 20 to the terminal box 14, a valve 22 is provided for controlling flow therethrough and through the diffuser 16 for discharge to the zone 18. The valve 22 is preferably of the hinged damper type, as shown, for minimizing valve actuator output requirements. A hinged connection at 24 provides for swingable valve movement in clockwise and counterclockwise directions respectively for duct opening and closing operation and for regulation of the flow of conditioned air through the diffuser 16.

An actuator for the valve 22 may vary widely in form but preferably comprises a bellows 26 mounted within the terminal box 14. The bellows 26 preferably has its centerline inclined between horizontal and vertical planes for enhanced mechanical advantage and, as shown, the bellows is mounted with its centerline at approximately 45° from the duct centerline. Further, the bellows 26 may be regarded as non-biased and operable for valve actuation in one and an opposite direction by positive and negative air pressure signals. More specifically, pressurization of the bellows will result in expansion thereof moving the valve 22 in a counterclockwise and duct closing direction and withdrawal of air therefrom results in bellows compression and clockwise valve movement in the duct opening direction. As will be seen, the bellows 26 is powered by conditioned air from the supply duct 10 as is a fluidic control for the bellows and valve.

In accordance with the present invention, a control for the bellows 26 and valve 22 is of the fluidic type and comprises signal comparison and amplifying means and associated means supplying at least two fluidic signals thereto. The signals to the fluidic means may vary widely and may be zone or other temperature signals, supply duct or other pressure signals, reference signals, etc. In the preferred form shown, the control is supply duct pressure and zone temperature responsive and maintains volumetric discharge in accordance with a preselected volume or pressure set-point compensating for changes in duct supply pressure and zone thermal load. More particularly, supply duct pressure is measured, compared with a preselected volume or pressure set-point and the resulting signal is modified by a zone temperature signal for amplification and control of the valve actuator 26.

As mentioned, conditioned air from supply duct 12 is employed as a power supply and a total pressure is preferred. Accordingly, a Pitot tube pick up at 28 communicates with supply conduit 30 which extends in turn to filter 32 and thence to branch conduits 34 and 36. Branch conduit 34 communicates with pressure regulator 38 which maintains a pressure to the fluidic comparison and amplifying means at approximately three fourths of an inch of water. The output of the regulator 38 is employed as an input $P_s$ via conduits 40, 42 for a first stage 44 of a multiple stage fluidic amplifier preferably comprising five additional stages 46, 48, 50, 52 and 54. Further, the regulator output is employed via conduit 56 to provide a volume or pressure set-point with a variable restriction 58. For example, a flow rate of 400 CFM may be desired and may require a preselected restriction setting to effect a downstream pressure of 0.2 inches of water at a pressure pick up 82. Still further, a zone temperature signal is conveniently introduced via conduit 56 by means of a thermostatic sensor of the interruptible jet type indicated by broken line 60.

A thermostat such as 60 may be employed at a diffuser such as 16 within a central cone 61 thereof or such a thermostat may be located in a zone such as 18 at a position remote from the diffuser. In the former case, it is the presently preferred practice to provide for the aspiration of zone air over the thermostat and such provision is illustrated in FIG. 1. A conduit 62 has an inlet end disposed at the cone 61 and extends therefrom to an aspirator 64, better illustrated in FIG. 2. The aspirator 64 has a supply conduit 66 extending from a Pitot tube 68 disposed in the supply duct 12 for a total pressure pick up. As will be apparent, relatively high pressure duct air emitted from a nozzle 70 in the aspirator will tend to create a negative pressure adjacent discharge end of conduit 62 whereby to induce a flow of zone air therethrough and over the thermostat 60 in the cone 61, response time of the thermostat thus being substantially improved.

Referring again to the broken line representation of thermostat 60, it will be observed that a bimetallic coil is provided at 72 with an end portion or valve 74 operable to interrupt a jet 76 and vary downstream pressure. A still further function of the aforesaid aspirator 64 resides in the removal of the slight flow of cold air dumped at the jet 76 and which might affect the accuracy of the thermostat coil. Thus, it will be apparent that a control signal input $C_1$ to amplifier stage 44 is a function of both volume or pressure set-point as established at restriction 58 and zone temperature.

A second fluidic control signal $C_2$ is provided via a conduit 78 extending from the first amplifier stage to a filter 80 and thence to a duct pressure pick-up at 82. The pick-up 82 is shown in the terminal box 14 but may be otherwise located. Further, a differential pressure pick-up may be desired in certain control systems as alternatively illustrated in FIG. 3 by lines 84 and 86. Thus, an orifice 90 may be provided in supply duct 10 and may be located either before or after valve 22 for a differential pressure pick-up in a conventional manner with pressure lines or conduits on opposite sides thereof. Output lines 84 and 86 are connected through filters 80a and 80b to first stage amplifier for differential control similar to the case of static pressure line 78.

A still further signal to the control of the present invention may optionally be provided in the form of a "warm up switch". During a warm up period of operation of the distribution system, the "warm up switch" overrides the thermostat 60 and provides for conditioned air flow at the aforesaid set-point thus distributing warm air uniformly in a multi-zone system. Block 79 may comprise a bimetallic coil controlling a diaphragm valve that by-passes pressure set-point established at 58 directly to control signal input C without reduction or reset as a function of zone temperature at thermostat 60. A fixed resistor in block 79 in parallel with the warm up switch limits minimum flow rate to assure warm air passage over the warm up switch sensor.

Referring now to stages 46 to 54 of the proportional amplifier, it will be observed that a power supply signal $P_s$ is provided in each instance from the conduit 36 with branch conduits 102, 104, 106, 108 and 110 respectively, serving the said stages. Output signals $O_1$ and $O_2$ from stage 44 respectively become control signals $C_1$ and $C_2$ for stage 46, with stage 46 outputs $O_1$ and $O_2$ respectively becoming control signals $C_1$ and $C_2$ for stage 48, etc. Thus, final stage 54 outputs $O_1$ and $O_2$ are proportional respectively to initial stage control signals $C_1$ and $C_2$ with $O_1$ being dumped or going to atmosphere as indicated. Final stage output $O_2$ is operative and is effective via conduit 112 in chamber 114 of diaphragm amplifier 115. Opposing chamber 116 is vented at 118 and includes an orifice controlled by the position of the diaphragm 122. Orifice 120 is formed at a discharge end of aforementioned conduit 36 and cooperates with a venturi section 124 in the conduit. Venturi 124 has a throat section 126 connected by a conduit 128 with valve actuating bellows 26 for operation of the latter in the manner described above.

In an illustrative example of operation, assume a setpoint pressure of 0.2 inches of water at 58 for 400 CFM flow. With wide open valve, the signal at pick-up 82 is 0.4 thus providing a $C_1$ control signal of 0.2 inches of water and a 0.4 inches of water pressure signal at $C_2$. Under such conditions, the $O_2$ output signal at the final stage 54 and in the diaphragm chamber 114 will be high causing the diaphragm 122 to close orifice 120 in turn pressurizing bellows 26 and causing valve 22 to be moved counterclockwise and in the closing direction. Equilibrium will be established with the duct pressure at 82 equals 0.2 inches of water corresponding to set-point 0.2 for desired flow rate discharge.

Assume now a changing thermal load in zone 18 causing a cool condition for occupants. Thermostat 60 will thereupon react with its coil 72 turning counterclockwise and moving the valve 74 to decrease pressure in conduit 56 and at control signal $C_1$. With $C_1$ less than $C_2$, the final stage output $O_2$ will cause diaphragm 122 to close orifice 120 further pressurizing bellows 26 until control signal $C_2$ corresponds to reduced signal at $C_1$. On further changing thermal load in zone 18 causing a warm condition for occupants, thermostat 60 will thereupon react with its coil 72 moving the valve 74 to increase pressure in conduit 56 and at control signal $C_1$. With $C_1$ greater than $C_2$, the final stage output will be lowered proportional to temperature change, permitting diaphragm 122 to move away from orifice 120 venting conduit 36.

Similarly, during warm-up operation, warm-up switch 79 operates to open valve 22 for preset CFM and uniform distribution of warm air throughout a multi-zone system.

We claim:

1. In an air distribution system for supplying conditioned air to at least one zone to be conditioned, the combination of a supply duct connected with a source of conditioned air under pressure, an air outlet connected with and supplied with conditioned air from said duct and communicating with said zone, a valve in said duct movable in duct opening and closing directions, a control for said valve comprising fluidic signal comparison and amplifying means, a power supply conduit for said fluidic means connected with said duct and responsive to a duct pressure, means providing at least two fluidic signals to said control means, at least one of said signals being responsive to a condition of duct or zone air, and a valve actuator operable under the control of said fluidic means and powered by said supply duct air, said actuator being connected with said valve for movement of the latter in said duct opening and closing directions and said fluidic means including means providing positive and negative air pressure signals to provide positive actuator action in each of said directions.

2. The combination in an air distribution system as set forth in claim 1 wherein said means providing positive and negative pressure signals to said actuator comprises a conduit carrying supply duct air with a venturi section and a connected conduit extending from the venturi throat to the actuator, said first conduit also having an associated means for varying flow through said venturi section under the control of said fluidic comparing and amplifying means whereby selectively to pressurize and draw air from the actuator.

3. The combination in an air distribution system as set forth in claim 1 wherein said actuator is of the bellows type and has an associated venturi section, the latter having its throat connected with the actuator whereby selectively to pressurize and draw air from the bellows.

4. The combination in an air distribution system as set forth in claim 1 wherein said means providing fluidic signals to said control means comprises a conduit extending from said duct to said control means and providing a duct pressure signal.

5. The combination in an air distribution system as set forth in claim 4 wherein said conduit is connected with said duct in such manner as to provide a duct static pressure signal.

6. A combination in an air distribution system as set forth in claim 4 wherein said conduit is connected with said supply duct in such manner as to supply a differential pressure signal.

7. A combination in an air distribution system as set forth in claim 4 wherein said means providing said fluidic signals includes an adjustable pressure set-point signal for comparison with said duct pressure signal.

8. The combination in an air distribution system as set forth in claim 1 wherein said means providing fluidic signals to said control means comprises a temperature-pressure transducer responsive to supply duct or zone air temperature and a connected conduit extending to said fluidic signal comparison and amplifying means.

9. The combination in an air distribution system as set forth in claim 8 wherein said temperature-pressure transducer is mounted within said zone.

10. The combination in an air distribution system as set forth in claim 8 wherein said temperature-pressure transducer is mounted on said diffuser and has an associated aspiration means for drawing zone air thereover and thereby enhancing response characteristics thereof, said aspiration means comprising an aspirating nozzle connected with a supply duct pressure tube and receiving duct pressure and a conduit having a discharge end at a low pressure zone created adjacent said nozzle, said inlet end of said conduit being disposed adjacent said temperature-pressure transducer and inducing zone air flow thereover.

11. The combination in an air distribution system as set forth in claim 8 wherein said means providing fluidic signals comprises a conduit extending from said duct to said control means and providing a duct pressure signal, and wherein said fluidic signals also include a manually adjustable pressure set-point signal for comparison with said duct pressure signal, the aforesaid temperature signal conduit being connected to override said pressure set-point signal.

12. The combination in an air distribution system as set forth in claim 11 wherein said fluidic signal means also includes a warm-up switch device connected to override said temperature signal and having a sensor disposed in said supply duct.

13. The combination in an air distribution system as set forth in claim 1 wherein said actuator is of the bellows type and said valve is arranged in said supply duct for hinged opening and closing movement as aforesaid.

14. The combination in an air distribution system as set forth in claim 13 wherein said bellows is arranged in said supply duct with its centerline inclined from the duct centerline for mechanical advantage in actuating said hinged valve.

15. The combination in an air distribution system as set forth in claim 1 wherein said power supply conduit is provided with a pitot tube at its inlet end in said duct for a duct pressure signal, and wherein a pressure regulator is provided in said conduit between said duct and a first stage of said fluidic amplifying means.

16. The combination in an air distribution system as set forth in claim 15 wherein said fluidic means comprises a multi-stage proportional amplifier and connected diaphragm amplifier receiving the output signal from the former and connected in turn with said valve actuator, the latter receiving duct pressure directly.

17. The combination in an air distribution system as set forth in claim 16 wherein said amplifier has an associated conduit with an orifice at a discharge end thereof controlled by the amplifier diaphragm, said conduit also including a venturi section and extending to said supply duct for a pressure pick-up, and wherein an actuator conduit is connected between said actuator for selective pressurization and positive withdrawal of air from the actuator.

18. The combination in an air distribution system as set forth in claim 17 wherein said valve member is of the hinged type and said actuator comprises an attached bellows on an inclined centerline.

19. The combination in an air distribution system as set forth in claim 18 wherein said fluidic signal means comprise duct static pressure, pressure set-point, and zone temperature signal means.

20. In an air distribution system for supplying conditioned air to at least one zone to be conditioned, the combination of a supply duct connected with a source of conditioned air under pressure, an air outlet connected with and suplied with conditioned air from said duct and communicating with said zone, a valve in said duct movable in duct opening and closing directions, a control for said valve comprising fluidic signal comparison and amplifying means, a power supply conduit for said fluidic means connected with said duct and responsive to a duct pressure, means providing at least two fluidic signals to said control, at least one of said signals being responsive to a condition of duct or zone air, and a valve actuator operable under the control of said fluidic means and powered by said supply duct air, said actuator being connected with said valve for movement of the latter in said duct opening and closing directions and said fluidic means including means providing air pressure signals to said actuator.

* * * * *